(12) United States Patent
Jivsov

(10) Patent No.: US 7,984,008 B2
(45) Date of Patent: Jul. 19, 2011

(54) EVALUATING THE PREDICTABILITY OF A PASS PHRASE

(75) Inventor: Andrey Jivsov, Mountain View, CA (US)

(73) Assignee: Symantec Corporation, Cupertino, CA (US)

(*) Notice: Subject to any disclaimer, the term of this patent is extended or adjusted under 35 U.S.C. 154(b) by 886 days.

(21) Appl. No.: 11/955,671

(22) Filed: Dec. 13, 2007

(65) Prior Publication Data

US 2009/0157588 A1     Jun. 18, 2009

(51) Int. Cl.
*G06F 17/00* (2006.01)
(52) U.S. Cl. .......................... 706/48; 713/182
(58) Field of Classification Search ............ 706/48; 340/5.85, 5.54; 700/237; 713/182, 183, 713/184
See application file for complete search history.

(56) References Cited

U.S. PATENT DOCUMENTS 6,643,784 B1 * 11/2003 McCulligh ............... 726/18
7,299,359 B2 * 11/2007 Hurley ..................... 713/182

OTHER PUBLICATIONS

Jianxin Jeff Yan. A note on proactive password checking. In Proceedings of the 2001 workshop on New security paradigms (NSPW '01). 2001. ACM, New York, NY, USA, 127-135.*

* cited by examiner

*Primary Examiner* — Jeffrey A Gaffin
*Assistant Examiner* — David H Kim
(74) *Attorney, Agent, or Firm* — Fenwick & West LLP

(57) ABSTRACT

Computer readable storage medium, computer-implemented method, and computer system for identifying substring repetition in a pass phrase. A sub-string index is generated. The number of bits required to represent each character in the pass phrase is determined. An entropy value is assigned to each character in the pass phrase in accordance with a probability function that assigns highest probabilities at boundaries of an interval for the entropy of a character, or that assigns lowest probabilities when a ratio of a number of pass phrase characters to pass phrase length is equal to a ratio of a size the interval to a sum of interval sizes. A total entropy value for the pass phrase is computed to provide an indication of pass phrase quality.

20 Claims, 7 Drawing Sheets

| Index | Encoding | Substitution |
|---|---|---|
| S0 | <S1><S1> | passphrasepassphrase |
| S1 | <S3><S2>s<S3>hr<S2>e | passphrase |
| S2 | as | as |
| S3 | p | p |

| $n_i \in [1, N]$ | $P_i(x=X)$ |
|---|---|
| 1 or $N$ | $\dfrac{1}{l_i}$ |
| $\dfrac{N \cdot l_i}{L}$ | $\dfrac{1}{L}$ |

| Letters | Digits | Entropy per letter | Entropy per digit | Total Entropy | Example |
|---|---|---|---|---|---|
| 15 | 1 | 4.79 | 3.32 | 75 | zttkgjsjyzitveg1 |
| 14 | 2 | 4.89 | 3.66 | 76 | zttkgjsjyzitve22 |
| 13 | 3 | 5.00 | 4.11 | 77 | zttkgjsjyzitv333 |
| 12 | 4 | 5.12 | 4.75 | 80 | zttkgjsjyzit4444 |
| 11 | 5 | 5.14 | 5.00 | 82 | zttkgjsjyzi55555 |
| 10 | 6 | 5.09 | 4.74 | 79 | zttkgjsjyz666666 |
| 9 | 7 | 5.04 | 4.51 | 76 | zttkgjsjy7777777 |
| 8 | 8 | 4.99 | 4.32 | 75 | zttkgjsj88888888 |
| 7 | 9 | 4.95 | 4.15 | 72 | zttkgjs999999999 |
| 6 | 10 | 4.90 | 4.00 | 69 | zttkgj0000000000 |
| 5 | 11 | 4.86 | 3.86 | 67 | zttkg11111111111 |
| 4 | 12 | 4.82 | 3.74 | 64 | zttk222222222222 |
| 3 | 13 | 4.78 | 3.62 | 61 | ztt3333333333333 |
| 2 | 14 | 4.74 | 3.52 | 59 | zt44444444444444 |
| 1 | 15 | 4.70 | 3.42 | 56 | z555555555555555 |

Figure 7

| Letters | Digits | Entropy per letter | Entropy per digit | Total Entropy | Example |
|---|---|---|---|---|---|
| 8 | 1 | 4.87 | 3.32 | 42 | jyzitveg1 |
| 7 | 2 | 5.06 | 4.27 | 44 | jyzitve22 |
| 6 | 3 | 5.12 | 4.91 | 45 | jyzitv333 |
| 5 | 4 | 5.03 | 4.49 | 43 | jyzit4444 |
| 4 | 5 | 4.93 | 4.17 | 40 | jyzi55555 |
| 3 | 6 | 4.85 | 3.91 | 38 | jyz666666 |
| 2 | 7 | 4.78 | 3.69 | 33 | jy7777777 |
| 1 | 8 | 4.70 | 3.49 | 32 | j88888888 |

Figure 8

| Substring index | Encoding | Substitution |
|---|---|---|
| S0 | <S1><S1> | passphrase1111passphrase1111 |
| S1 | <S3><S2>s<S3>hr<S2>e<S4><S4> | passphrase1111 |
| S2 | as | as |
| S3 | p | p |
| S4 | 11 | 11 |

Figure 9

EVALUATING THE PREDICTABILITY OF A PASS PHRASE

BRIEF DESCRIPTION OF THE INVENTION

This invention relates generally to computer security. More particularly, this invention relates to techniques for evaluating the predictability of a pass phrase used to access a computer resource.

BACKGROUND OF THE INVENTION

Most computer systems require a log in sequence to access a computer resource. The log in sequence typically requires a user to specify a user name and a pass word or pass phrase. Many systems require that the pass phrase have a specified number of alphabetic, numeric and/or special symbol characters to reduce the ability of a non-authorized user to fraudulently access a computer resource. Some systems compare a proposed pass phrase to a dictionary. If dictionary matches are found, the user may be warned that the proposed pass phrase is predictable.

It would be desirable to provide more sophisticated techniques for evaluating a pass phrase. In particular, it would be desirable to provide techniques that augment or replace the use of dictionaries in assessing a pass phrase. Ideally, the techniques would provide a numeric measure of the predictability of a proposed pass phrase.

SUMMARY OF THE INVENTION

The invention includes a non-transitory computer readable storage medium, a computer-implemented method, and a computer system, that identify sub-string repetition in a pass phrase. A sub-string index is generated. The number of bits required to represent each character in the pass phrase is determined. An entropy value is assigned to each character in the pass phrase in accordance with a probability function that assigns highest probabilities at boundaries of an interval for the entropy of a character, or that assigns lowest probabilities when a ratio of a number of pass phrase characters to pass phrase length is equal to a ratio of a size the interval to a sum of interval sizes. A total entropy value for the pass phrase is computed to provide an indication of pass phrase quality.

BRIEF DESCRIPTION OF THE FIGURES

The invention is more fully appreciated in connection with the following detailed description taken in conjunction with the accompanying drawings, in which:

FIG. 7 illustrates entropy computations derived for various pass phrases processed in accordance with an embodiment of the invention.

FIG. 8 illustrates entropy computation derived for various pass phrases processed in accordance with an embodiment of the invention.

FIG. 9 illustrates sub-string index encoding in accordance with an embodiment of the invention.

Like reference numerals refer to corresponding parts throughout the several views of the drawings.

DETAILED DESCRIPTION OF THE INVENTION

Figure 1:
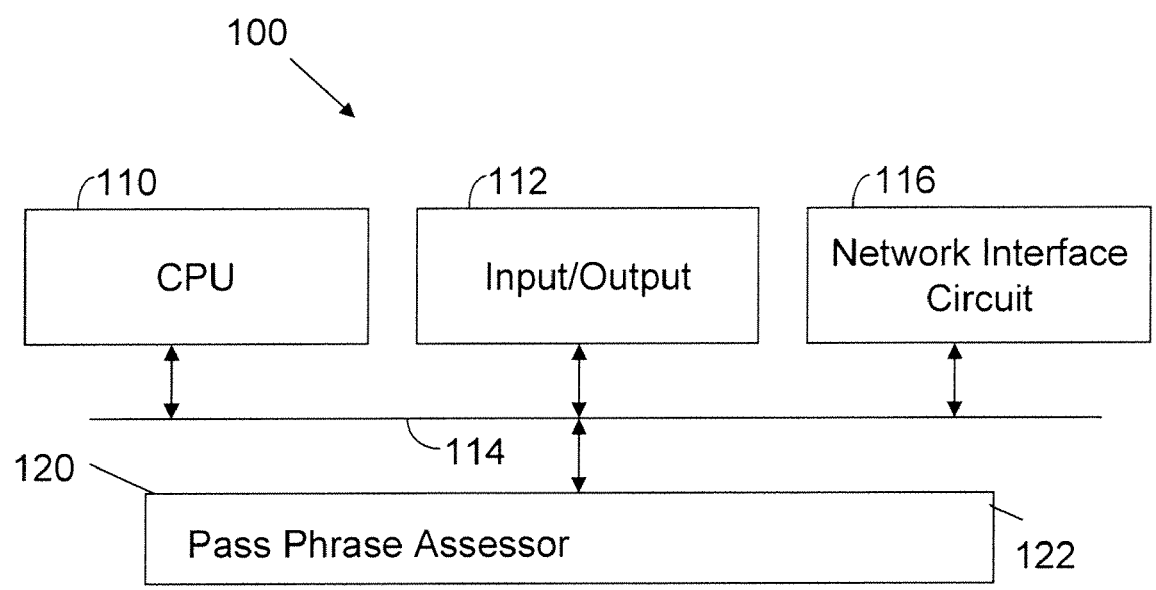
FIG. 1 illustrates a computer configured in accordance with an embodiment of the invention.

FIG. 1 illustrates a computer 100 configured in accordance with an embodiment of the invention. The computer 100 includes a central processing unit (CPU) 110 connected to a set of input/output devices 112 via a bus 114. The input output devices 112 may include standard components, such as a keyboard, mouse, display, printer and the like. Also connected to the bus 114 is a network interface circuit 116, which provides connectivity to a network (not shown). Thus, the invention may operate on a stand-alone computer or in a networked environment.

A memory 120 is also connected to the bus 114. The memory 120 stores a pass phrase assessor 122. The pass phrase assessor 122 includes executable instructions to implement operations associated with the invention. In particular, the pass phrase assessor 122 includes executable instructions to receive a pass phrase, process the pass phrase to generate a measure of the predictability of the pass phrase, and provide an indication of the predictability of the pass phrase. If the pass phrase does not meet a specified threshold, it may be rejected, forcing the user to specify another pass phrase. The pass phrase assessor 122 may be implemented without the use of a dictionary, but is also operative with a dictionary in an alternate embodiment.

Figure 2:
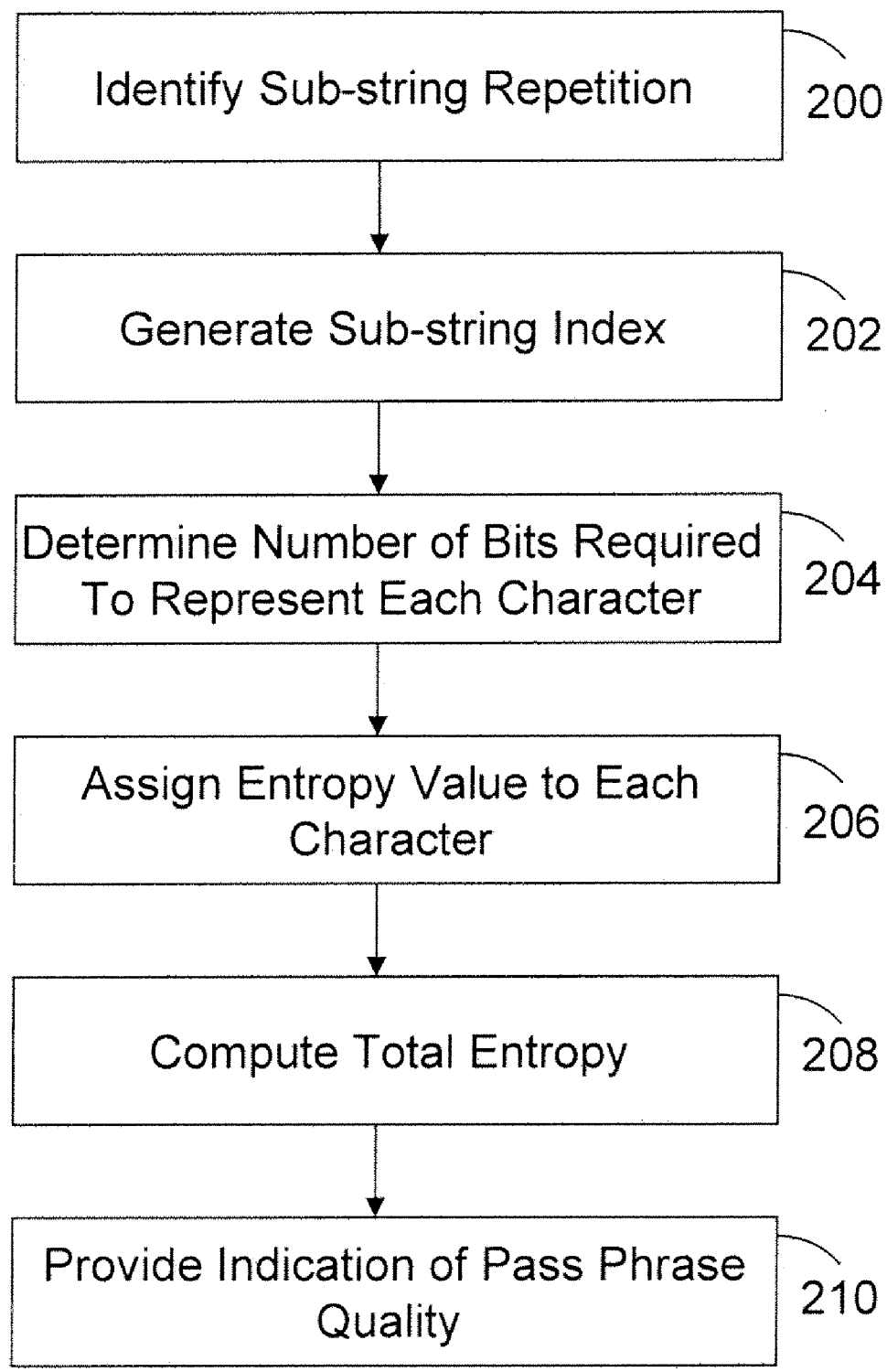
FIG. 2 illustrates processing operations associated with an embodiment of the invention.

FIG. 2 illustrates processing operations associated a pass phrase assessor 122 of the invention. The pass phrase assessor 122 initially identifies sub-string repetition within a pass phrase 200. A sub-string is one or more characters that occur at least twice in the pass phrase. A sub-string index is then generated 202. In particular, duplicate sub-strings are replaced by references to them in an index, as demonstrated below.

Next, the number of bits required to represent each character is computed 204. An example of this technique is provided below. An entropy value is then assigned to each character 206. An example of this computation is also provided below. A total entropy value is then computed 208. The total entropy value is then used to provide an indication of pass phrase quality 210. The use of an index compresses the pass phrase. The degree of compression corresponds to redundancy or predictability. Predictability is the inverse of entropy. Thus, high entropy reflects low predictability.

Figure 3:
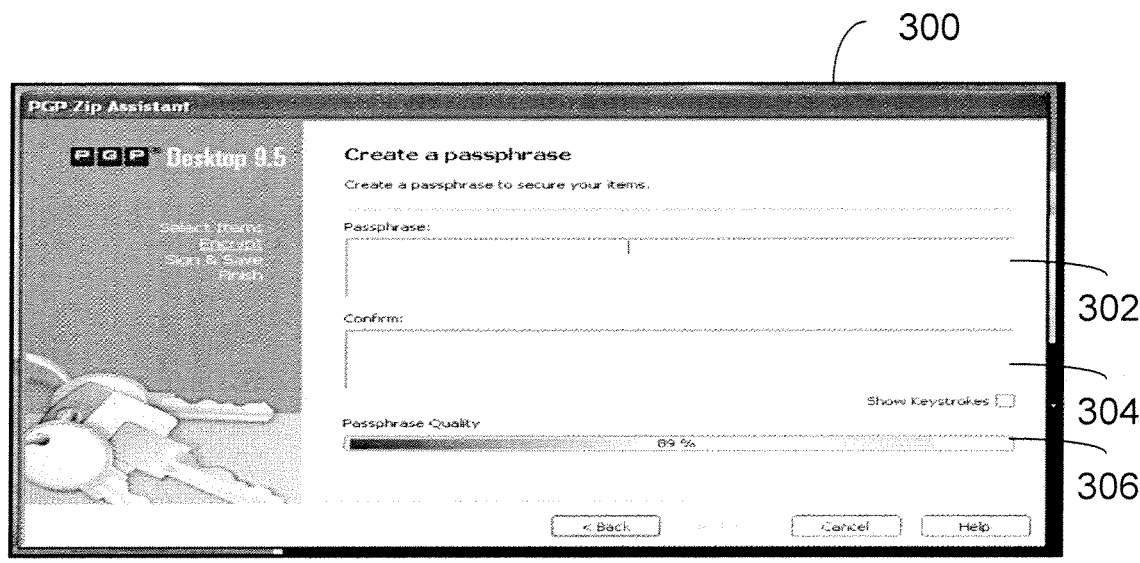
FIG. 3 illustrates a graphical user interface providing pass phrase quality feedback in accordance with an embodiment of the invention.

FIG. 3 illustrates a graphical user interface 300 that may be provided by the pass phrase assessor 122. A pass phrase may be entered into block 302, with the same pass phrase entered into the confirmation block 304. The pass phrase assessor 122 then processes the pass phrase to provide a visual indication 306 of the quality of the pass phrase. The entropy value may be expressed as a percentage (e.g., Entropy/bit length*100). In this example, the visual indication 306 includes a computed pass phrase quality value (89%) and an associated slider value corresponding to the value. The slider value may utilize color (e.g., red, yellow, green) to indicate pass phrase quality. A threshold (e.g., 70%) may be specified for a valid pass phrase.

As previously indicated, a pass phrase is split into a set of sub-strings, where each sub-string occurs at least twice in a pass phrase. Duplicate sub-strings are then replaced by references to them. References to a sub-string are expressed in an index. Consider the pass phrase "passphrasepassphrase". The techniques of the invention are used to convert the pass phrase into the index shown in FIG. 4.

Figures 4, 5:
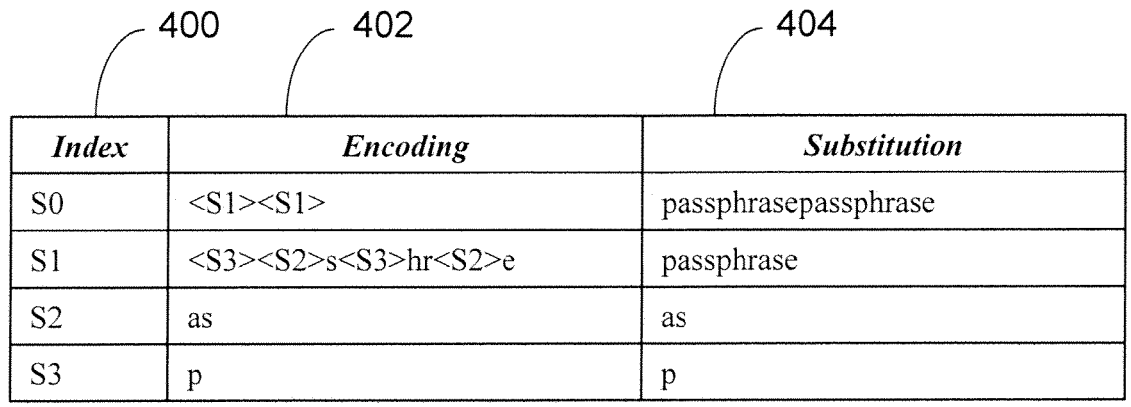
FIG. 4 illustrates sub-string index encoding in accordance with an embodiment of the invention.
FIGS. 5-6 illustrate entropy values utilized for individual pass phrase characters in accordance with an embodiment of the invention.

FIG. 4 illustrates a table with an index column 400, an encoding column 402 and a substitution column 404. In this example, four index values S0-S3 are established. Index value S3 has an encoding to the letter "p" because "p" occurs more than once in the pass phrase. Index value S2 has an encoding to the letters "as" because these letters occur more than once in the pass phrase. Index value S1 is expressed with index values S3 and S2 along with the non-repeated letters "s", "hr" and "e". Using these expressions the term "passphrase" is formed, as shown in the substitution column 404. The substitution is formed as follows: S3=p (the "p" in "passphrase"), S2=as (the "as" in "passphrase"), s (the "s" in passphrase"), S3=p (the "p" in ("passphrase"), hr (the "hr" in "passphrase"), S2=as (the "as" in "passphrase"), and e (the "e" in "passphrase"). The full pass phrase is then expressed as index S0, which is encoded as <S1><S1>.

At this point, the processing of operations 200 and 202 of FIG. 2 is completed. The number of bits required to represent each character is now computed 204. In accordance with one embodiment of the invention, one additional bit is added per each character and no bits are used for each reference <Sj>. This accounts for encoding overhead. The entropy of each index $S_j$ is log(J). The reference to a one-character sub-string is not counted the first time it occurs. Thus, this approach compresses the sample passphrase in the above example into 7 characters and 6 sub-string references, with one of the references, <S3>, referencing a one-character string "p". Assuming that there are 26 characters in the alphabet, the final result is given as:

$$S=7*(\log(26)+1)+(6-1)*\log(J)=50 \text{ bits} \quad \text{(Equation 1)}$$

In equation 1, 7 references 7 characters. A one is added to log(26) to indicate the difference between an index and a character. The expression (6−1) includes a 6 corresponding to the six indexes in the encoding column (i.e., <S1>, <S1>, <S3>, <S2>, <S3>, <S2>). A one is subtracted from 6 because the reference to the first character sub-string is not counted the first time. The J in log(J) is the maximum number of indices.

By way of comparison, a naïve estimation would be as follows:

$$S=20*\log(26)=94 \text{ bits} \quad \text{(Equation 2)}$$

The value 20 in Equation 2 is the number of characters in the pass phrase, while the value 26 corresponds to the number of letters in the alphabet. Thus, Equation 1 accounts for redundancy, which results in a compressed characterization of the pass phrase.

The computation of entropy for each character 206 is the next operation associated with the pass phrase assessor 122. Assume the general case when the pass phrase consists of characters from the Unicode space. The characters of the pass phrase are first classified on the basis of their inclusion into a particular subset of whole Unicode range.

When all the N characters of the pass phrase are from a single range with length L, the entropy is:

$$S=N*\text{Log}(L) \quad \text{(Equation 3)}$$

In the more common scenario where the characters are from different Unicode ranges (e.g., alphabet (26) or number (10)), the entropy of the pass phrase of length N is the sum S defined by:

$$S = \sum n_i \cdot S_i \quad \text{Equation 4}$$

$$S_i = E\left(\log \frac{1}{P_i(x=X)}\right) = \log \frac{1}{P_i(x=X)}$$

$$= n_i < N \cdot \frac{l_i}{L} \Rightarrow \log \frac{N \cdot l_i^2 - L \cdot l_i}{(N \cdot l_i - L) - (L - l_i)(n_i - 1)}$$

$$n \geq N \cdot \frac{l_i}{L} \Rightarrow \log \frac{N \cdot l_i}{n_i}$$

$$L = \sum l_i - \text{length of relevant Unicode ranges}$$

$l_i$ − length of relevant Unicode range $i$ $$N = \sum n_i - \text{pass phrase length}$$

$n_i$ − number of characters in Unicode range $i$

Figure 6:
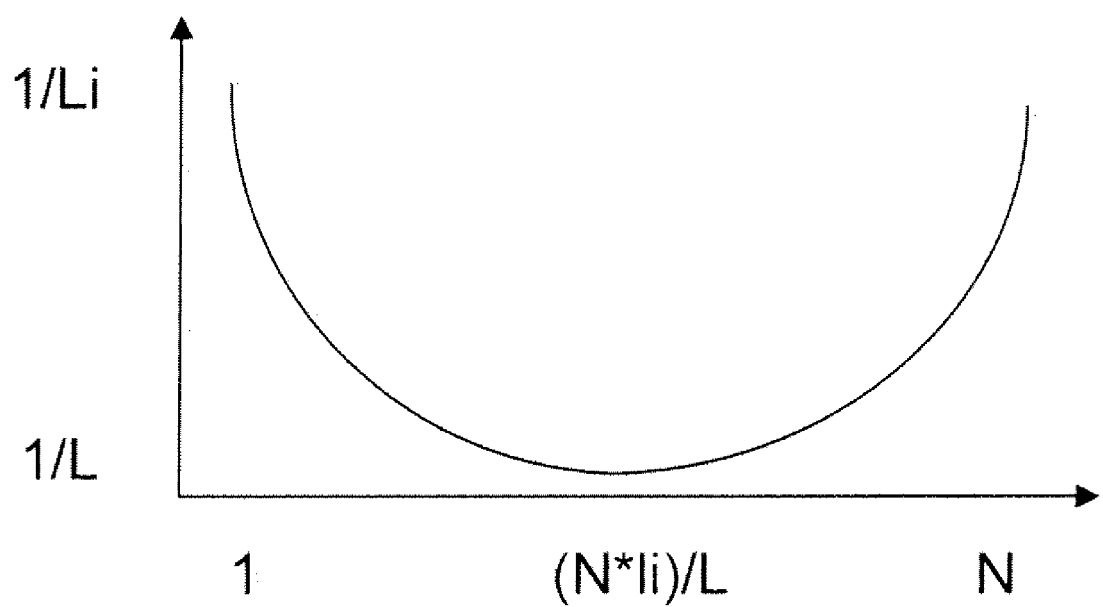

This formula was derived analytically using the following probability function defined for each interval. The function is uniformly distributed in each interval. Each numerator and denominator is a positive number. Each interval may contain between 1 to N characters. The relationship is shown in FIG. 5. A graphical representation of this function is shown in FIG. 6.

The probability function is chosen to exhibit the following behavior: on the boundaries the probability function is highest and shows that the likelihood of the character is only defined by the interval i to which the character belongs, regardless of properties of other intervals. When the ratio of the number of pass phrase characters to the pass phrase length is equal to the ratio of the size of the interval to the sum of interval sizes, the probability function is minimized because the character is expected to belong equally likely to any interval. This is designed to properly account for typical password policies, such as "at least 1 digit and 7 alphabet characters", which may reduce overall entropy. This probability function is then linearly interpolated. Floating point arithmetic is used to properly accumulate entropy bits. Integral arithmetic produces the error on the order of N bits per pass phrase.

To understand how this method affects the pass phrase entropy estimation, consider the 16 byte pass phrase consisting of lower case Latin characters and digits. In other words, there are two relevant Unicode ranges. When calculating total entropy in this example repetitions are not accounted for. This results in the information of FIG. 7. The entropy per character is maximized on the highlighted row 700, where the pass phrase contains 11 letters and 5 digits. In general, the larger the number of both letters and digits, the higher the entropy. Relatively low entropy is found in row 702, where the pass phrase has 15 digits and 1 letter. Row 704 has a pass phrase with 15 letters and one digit, but has better entropy because of the larger range associated with letters (i.e., 26 letters versus 10 digits).

The techniques of the invention may be used to process example pass phrases of FIG. 8. FIG. 8 illustrates the resultant total entropy values. Observe that the results in FIG. 8 are consistent with those found in FIG. 7.

As a final example, consider the entropy estimation for the pass phrase "passphrase1111passphrase1111". First, the pass phrase is compressed to produce the sub-string index of FIG. 9. The string is represented by sub-strings <S1> to <S4>, therefore 2 bits are needed to encode an index for each of the 4 sub-strings. There are 9 original characters in the set, 7 lowercase letters and 2 digits. Referring to FIG. 8, row 800 has total entropy of 44. If one bit is added per each of the 9 characters, the number of bits required to represent each character is 53. In this example there are 8 indexes, but one of them references one-character sub-string "p", so the number is reduced to get 7 indexes. With two bits per index, this adds 14 bits of entropy. Summing the two numbers results in 67 bits. To simplify the concept of entropy, this result may be reported as a percentage against the value 128, which is 52%.

Compare this with the number that would be obtained if the pass phrase is the repetition of up to two sub-strings, each word being a sequence of 10 letters followed by a few identical digits. In this case, one would proceed as follows: 1+10*log (26)+2*log (10)=1+10*4.70+log (8)+3.5=55. Given the beforehand assumptions, this lower boundary estimate is close to what was obtained using a generic method.

One of the benefits of the invention is that it enables the implementation of a simple interface, such as "int get_entropy(const char*string)". Advantageously, this interface does not have an external dependency.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   identify sub-string repetition in a pass phrase;
   generate a sub-string index;
   determine the number of bits required to represent each character in the pass phrase;
   assign an entropy value to each character in the pass phrase in accordance with a probability function that assigns highest probabilities at boundaries of an interval for the entropy of a character; and
   compute a total entropy value for the pass phrase.

2. The computer readable storage medium of claim 1 wherein the executable instructions to identify include executable instructions to identify a sub-string as one or more characters that occurs at least twice in the pass phrase.

3. The computer readable storage medium of claim 1 wherein the executable instructions to generate a sub-string index include executable instructions to replace duplicate sub-strings in the sub-string index with sub-string references.

4. The computer readable storage medium of claim 1 wherein the executable instructions to assign an entropy value include executable instructions to assign an entropy value in accordance with a probability function that expresses the likelihood of a character as being defined by the interval in which the character belongs.

5. The computer readable storage medium of claim 1 wherein the executable instructions to assign an entropy value include executable instructions to assign an entropy value in accordance with a probability function that assigns the lowest probability when the ratio of the number of pass phrase characters to pass phrase length is equal to the ratio of the size the interval to the sum of interval sizes.

6. The computer readable storage medium of claim 1 further comprising executable instructions to provide an indication of pass phrase quality.

7. The computer readable storage medium of claim 6 wherein the pass phrase quality is expressed as an entropy percentage value.

8. The computer readable storage medium of claim 6 wherein the pass phrase quality is expressed as a graphical component.

9. The computer readable storage medium of claim 1 further comprising executable instructions specifying a required pass phrase threshold value.

10. A computer-implemented method comprising:
    identifying sub-string repetition in a pass phrase;
    generating a sub-string index;
    determining a number of bits required to represent each character in the pass phrase;
    assigning, using a processor, an entropy value to each character in the pass phrase in accordance with a probability function that assigns lowest probabilities when a ratio of a number of pass phrase characters to pass phrase length is equal to a ratio of a size the interval to a sum of interval sizes; and
    computing a total entropy value for the pass phrase.

11. The computer-implemented method of claim 10, wherein the identifying comprises identifying a sub-string as one or more characters that occurs at least twice in the pass phrase.

12. The computer-implemented method of claim 10, wherein generating a sub-string index comprises replacing duplicate sub-strings in the sub-string index with sub-string references.

13. The computer-implemented method of claim 10, wherein the entropy value is assigned in accordance with a probability function that assigns the highest probabilities at the boundaries of the interval for the entropy of a character.

14. The computer-implemented method of claim 10, wherein the entropy value is assigned in accordance with a probability function that expresses the likelihood of a character as being defined by the interval in which the character belongs.

15. The computer-implemented method of claim 10, further comprising executable instructions to provide an indication of pass phrase quality as an expression of an entropy percentage value.

16. The computer-implemented method of claim 10, further comprising specifying a required pass phrase threshold value for the total entropy of the pass phrase.

17. A computer system comprising:

a computer processor; and a computer-readable storage medium comprising instructions executable by the processor and when executed performing actions comprising:

identifying sub-string repetition in a pass phrase;

generating a sub-string index;

determining the number of bits required to represent each character in the pass phrase;

assigning an entropy value to each character in the pass phrase in accordance with a probability function that assigns highest probabilities at boundaries of an interval for the entropy of a character; and computing a total entropy value for the pass phrase.

18. The computer system of claim 17, wherein the generating comprises replacing duplicate sub-strings in the sub-string index with sub-string references.

19. The computer system of claim 17, wherein the entropy value is assigned in accordance with a probability function that expresses the likelihood of a character as being defined by the interval in which the character belongs.

20. The computer system of claim 17, wherein the entropy value is assigned in accordance with a probability function that assigns the lowest probability when the ratio of the number of pass phrase characters to pass phrase length is equal to the ratio of the size the interval to the sum of interval sizes.

* * * * *